US010974456B2

(12) United States Patent
Khairallah et al.

(10) Patent No.: US 10,974,456 B2
(45) Date of Patent: Apr. 13, 2021

(54) ADDITIVE MANUFACTURING POWER MAP TO MITIGATE DEFECTS

(71) Applicant: LAWRENCE LIVERMORE NATIONAL SECURITY, LLC, Livermore, CA (US)

(72) Inventors: Saad A. Khairallah, Livermore, CA (US); Gabe Guss, Manteca, CA (US); Wayne E. King, Danville, CA (US); Manyalibo Joseph Matthews, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 155 days.

(21) Appl. No.: 16/145,483

(22) Filed: Sep. 28, 2018

(65) Prior Publication Data
US 2019/0291348 A1 Sep. 26, 2019

Related U.S. Application Data

(60) Provisional application No. 62/647,375, filed on Mar. 23, 2018.

(51) Int. Cl.
G05B 15/02 (2006.01)
B29C 64/393 (2017.01)
B29C 64/268 (2017.01)
B29C 64/153 (2017.01)
B23K 26/08 (2014.01)

(52) U.S. Cl.
CPC .......... B29C 64/393 (2017.08); B23K 26/083 (2013.01); B29C 64/153 (2017.08); B29C 64/268 (2017.08); G05B 15/02 (2013.01); G05B 2219/45154 (2013.01); G05B 2219/49018 (2013.01)

(58) Field of Classification Search
CPC ... B23K 26/083; B29C 64/153; B29C 64/268; B29C 64/393
See application file for complete search history.

(56) References Cited

U.S. PATENT DOCUMENTS

| 2009/0206065 | A1* | 8/2009 | Kruth | B22F 3/1055 |
| | | | | 219/121.66 |
| 2014/0249773 | A1 | 9/2014 | Beuth, Jr. | |
| 2014/0252685 | A1 | 9/2014 | Stucker et al. | |
| 2017/0120518 | A1 | 5/2017 | DeMuth et al. | |
| 2017/0320168 | A1* | 11/2017 | Martinsen | B22F 3/1055 |
| 2018/0133801 | A1* | 5/2018 | Buller | B23K 26/032 |

FOREIGN PATENT DOCUMENTS

WO 2017121995 7/2017

* cited by examiner

Primary Examiner — Yuhui R Pan
(74) Attorney, Agent, or Firm — Eddie E. Scott

(57) ABSTRACT

A laser powder bed fusion additive manufacturing system for producing a part by creating a power map that is an intelligent feed forward model to control the laser powder bed fusion additive manufacturing for producing the part and using the power map to control the laser powder bed fusion additive manufacturing for producing the part. This includes an apparatus for producing a part including a powder bed, a laser that produces a laser beam, a proportional integral derivative controller that creates a power map that describes laser power requirements as the laser moves along a path, wherein the laser power requirements prevent defects in the part.

8 Claims, 5 Drawing Sheets

ADDITIVE MANUFACTURING POWER MAP TO MITIGATE DEFECTS

CROSS-REFERENCE TO RELATED APPLICATIONS

This application claims priority to and benefit under 35 U.S.C. § 119(e) of U.S. Provisional Patent Application No. 62/647,375 filed Mar. 23, 2018 entitled "additive manufacturing power map to mitigate defects," the content of which is hereby incorporated by reference in its entirety for all purposes.

STATEMENT AS TO RIGHTS TO APPLICATIONS MADE UNDER FEDERALLY SPONSORED RESEARCH AND DEVELOPMENT

The United States Government has rights in this application pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present application relates to additive manufacturing and more particularly to an additive manufacturing (AM) power map, generated by a software model of the AM process, to mitigate defects.

State of Technology

This section provides background information related to the present disclosure which is not necessarily prior art.

Conventional laser powder bed fusion additive manufacturing machines "lock down" the process parameters for the duration of a production cycle. They need a novel way to optimize various parameters during the build process, like laser power, speed, and beam size, all of which affect the length, width, and depth of the resulting melt pool. Generally speaking, it is desirable to maintain a constant or controlled melt pool geometry during a build. However, the parameters required to achieve desired melt pool characteristics will always be a function of the part geometry, like in this case, when the laser performs a corner turning. The aim of the inventor's power map is to "feed forward" the optimized laser parameters to eliminate pore defects at the corner. The power map is produced using a simulation or reduced order model or any other experimental methods that allow monitoring the state of the melt pool such as melt pool depth or temperature at a high fidelity, whereby the conditions related to the material being 3D printed are considered. This can be done typically before actually performing the build. The power map can be generated for single melt tracks, multiple melt tracks along a plane and or by building a full part that requires control over certain variables, such as heat or stress, that are direct functions of the input process parameters such as laser power and, or laser scan speed. The power map can then be used in an AM machine to control the laser power as it is scanning. Note that, the concept of producing maps is not limited to power maps, as other control strategies allow to control the laser speed, beam width and or laser speed and laser power at the same time. This methodology also applies to non-laser energy related beams such as with electron beams.

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

The inventors have developed a laser powder bed fusion additive manufacturing system for producing a part by creating a power map that is an intelligent feed forward model to control the laser powder bed fusion additive manufacturing for producing the part and using the power map to control the laser powder bed fusion additive manufacturing for producing the part. This includes an apparatus for producing a part including a powder bed, a laser that produces a laser beam, a proportional integral derivative controller that creates a power map that describes laser power requirements as the laser moves along a path, wherein the laser power requirements prevent defects in the part.

The inventors' apparatus, systems, and methods provide an intelligent feed forward model to control additive manufacturing (AM) laser powder bed fusion process, whereby, defects are eliminated by controlling the laser power through a computer model. This application describes using a proportional integral derivative (PID) controller to create a power map for when the laser is scanning in any way and direction such as performing a corner turning. The PID controller would be controlling a tracer point that follows the laser beam. The point can be located below the laser beam inside the substrate at a given depth. At that point, a quantity of interest is monitored. One such quantity can be the temperature of the melt. By assigning a constant temperature value equal to the melt temperature of the alloy, one can maintain a constant melt pool depth or simply control the melt pool depth, by controlling the location of the moving tracer point with time.

The benefit of the process map is to eliminate pore defects such as those that appear after executing a turn at the corner. These defects are random in nature. Their presence prevent machine to machine reproducibility of same AM parts. Also, they have a deleterious effect on part properties. Removing them is a major need and requirement for future AM machines. The inventors' apparatus, systems, and methods use a Proportional Integral Derivative (PID) controller to create a closed control loop system to predict laser power mitigation strategies. This PID creates a power map for when the laser performs a corner turning. This leads to an Intelligent Feed Forward (IFF) model when using computer modeling to control the SLM process whereby defects are eliminated by controlling the laser power through a computer model.

Some of the benefits and value of the inventors' apparatus, systems, and methods are identified below.

Higher quality parts (no voids, reduced porosity, better surface roughness)

Increase machine-to-machine reproducibility
Less waste, as the expensive metal powder untouched in the powder bed can be recycled
Reduce thermal residual stress build-up The inventors' apparatus, systems, and methods will be used by Laser PBFAM OEMs that use energy beams to 3D print parts. Metal AM is a growing area in manufacturing, especially in the Aerospace, Energy and Medical industries. According to the Wohler's Report metal AM grew 76% from 2012 to 2013. New techniques to address cost and time of production are expected to be quickly adopted.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

DETAILED DESCRIPTION OF SPECIFIC EMBODIMENTS

Figure 1:
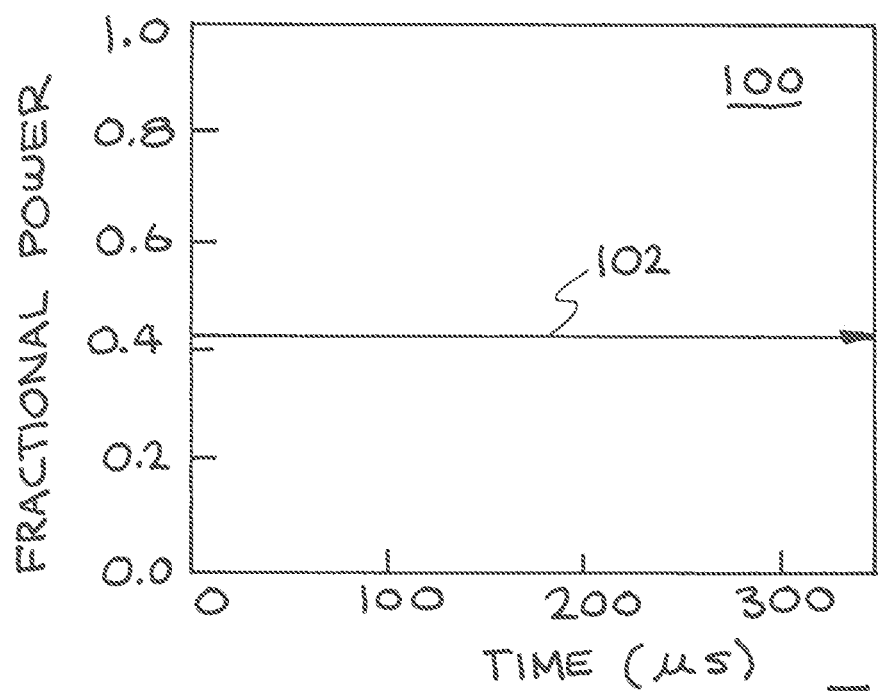
FIG. 1 is a graph that visually illustrates laser power versus time.

The Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

The inventors have developed an additive manufacturing (AM) power map for a powder bed fusion system. The power map describes desired laser power changes as the laser moves along a path. When the power map is adopted by an AM machine, the laser power is changed appropriately to prevent defects. Referring now to the drawings, and in particular to FIGS. 1 thru 9, Applicants' will describe and illustrate problems that may occur during the making of a part by the AM process. In FIG. 1 a graph 100 visually illustrates laser power versus time as the laser moves along a path in an AM machine. The power to the laser 102 beam is held at a constant level throughout the process illustrated in FIGS. 1 thru 9.

Figure 2:
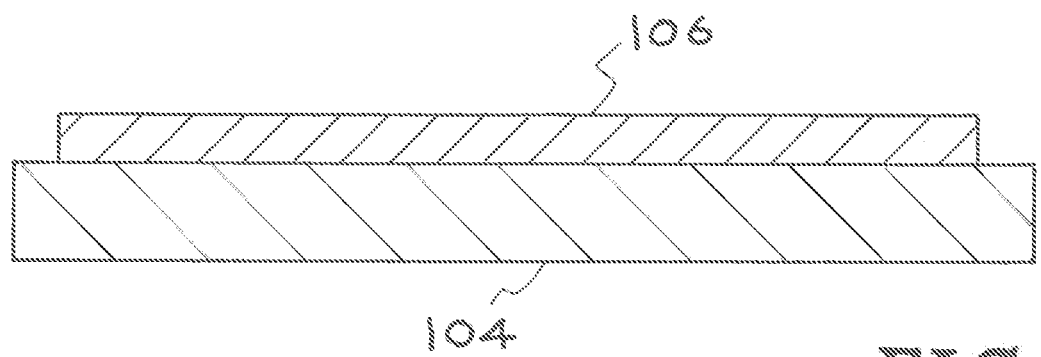
FIG. 2 is a schematic illustration of a build plane/substrate with a powder layer.

Referring now to FIG. 2, a schematic illustration shows a build plane/substrate 104 with a powder layer 106. The powder layer 106 covers all or a substantial portion of the build plane/substrate 104. The AM machine uses either a laser or electron beam to melt and fuse metal powder together in a layer by layer process to build a workpiece. There are different mechanisms available for adding the metal powder layer onto the build plane/substrate 104. For example, a hopper or a reservoir can be used to add fresh metal powder 106 for each layer in the layer by layer process. There are different mechanisms available to enable the spreading of the metal powder over previous layers. For example, a roller or a blade can be used to spread the metal powder.

Figure 3:
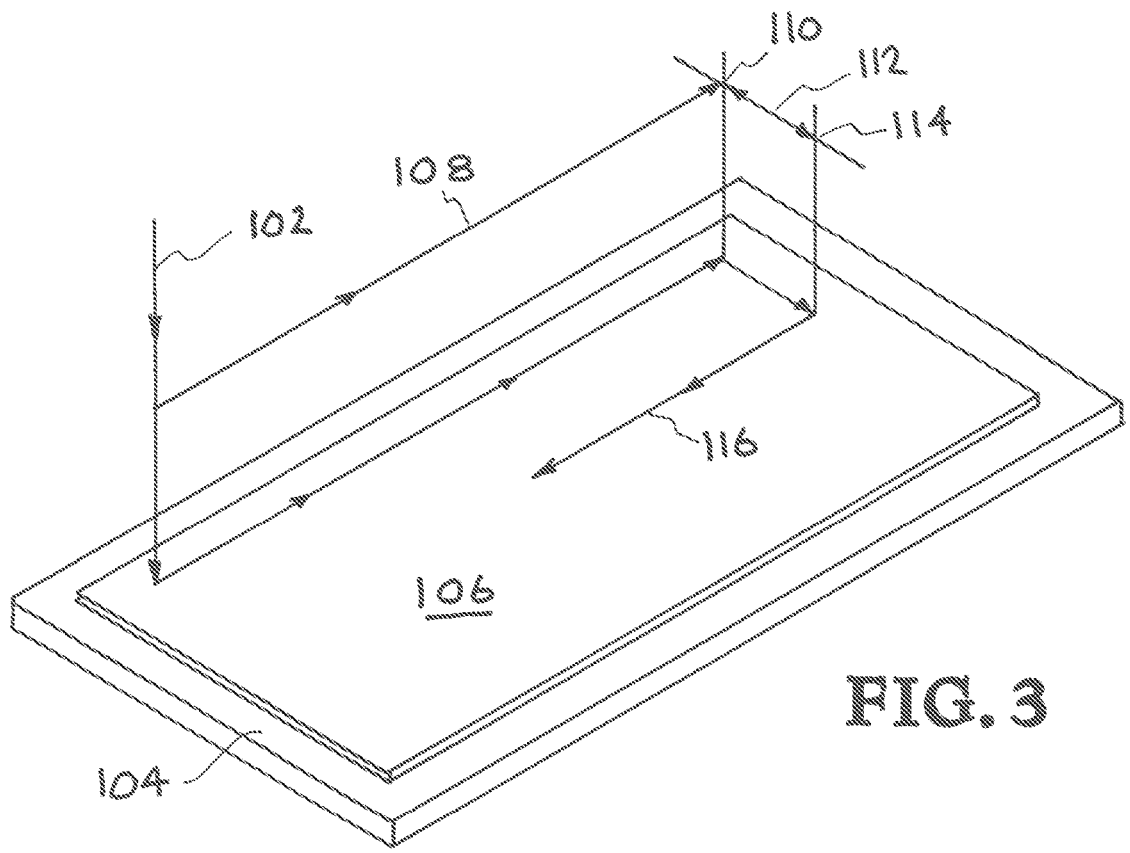
FIG. 3 is a schematic illustration showing the path of the laser beam on the powder layer.

Referring now to FIG. 3, a schematic illustration shows the path of the laser beam 102 on the powder layer 106. The laser beam 102 makes the first pass 108 and reaches a first turning point 110. The laser beam 102 then turns 90 degrees, travels a very small distance 112, and reaches a second turning point 114. The laser beam 102 then proceeds on the path 116. This basic operation and multiple variations of this basic operation will happen millions of times during the additive manufacturing of a complex part.

Figure 4:
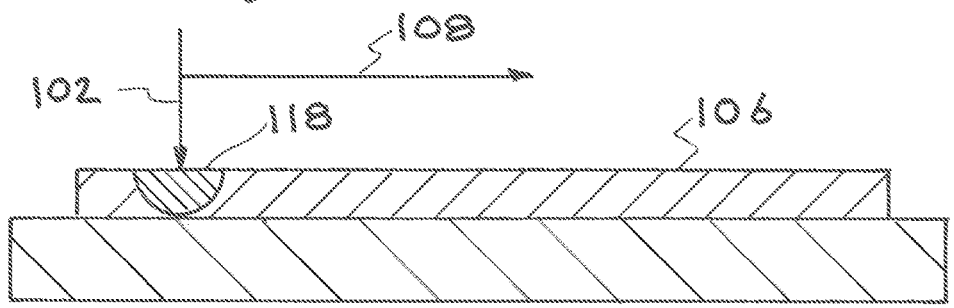
FIG. 4 is a schematic illustration showing the laser beam creating a melt pool in the powder layer.

Referring now to FIG. 4, a schematic illustration shows the laser beam 102 creating a melt pool 118 in the powder layer 106. The laser is turned on and in the initial moments the laser beam 102 will melt the metal powder 106 and create a depression of molten metal 118. As the laser beam 102 progresses along the laser beam path 108 a solidified powder area is formed.

Figure 5:
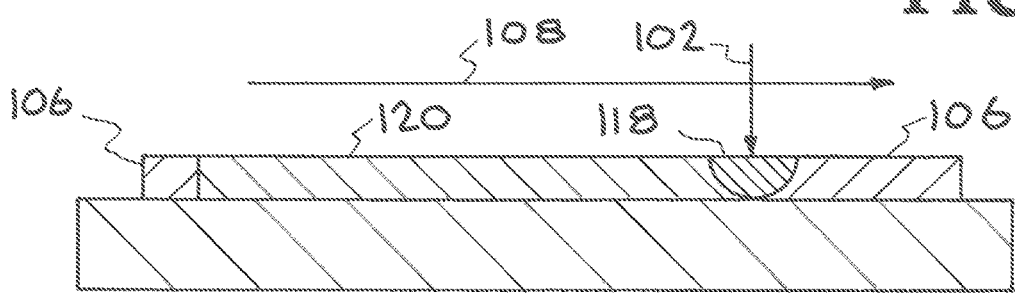
FIG. 5 is a schematic illustration illustrating that as the laser beam follows its path the melt pool flows with the laser beam leaving a fused layer in its path.

Referring now to FIG. 5, a schematic illustration shows that as the laser beam 102 follows the path 108 the melt pool 118 flows with the laser beam 102 leaving a fused layer 120 in its path. The power of the laser is maintained at a steady setting and the laser beam path 102 maintains a steady straight line as it moves through the first pass 108. By making multiple passes, multiple layers of selected areas of the powder bed 106 are solidified in a layer-by-layer manner to form the workpiece. In each of the multiple steady straight line paths 108 the metal powder 106 is melted creating the depression of molten metal 118 and as the laser beam 102 progresses along the laser beam path 108 the solidified powder area 120 is formed to produce the multiple layers of the workpiece and eventually the finished product or part.

Figure 6:
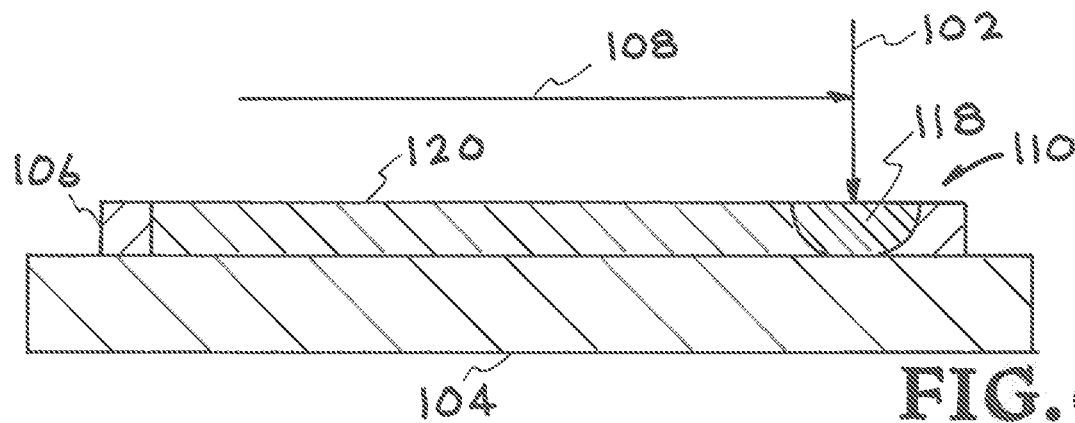
FIG. 6 is a schematic illustration showing the laser beam having reached the first turning point.
Figure 7:
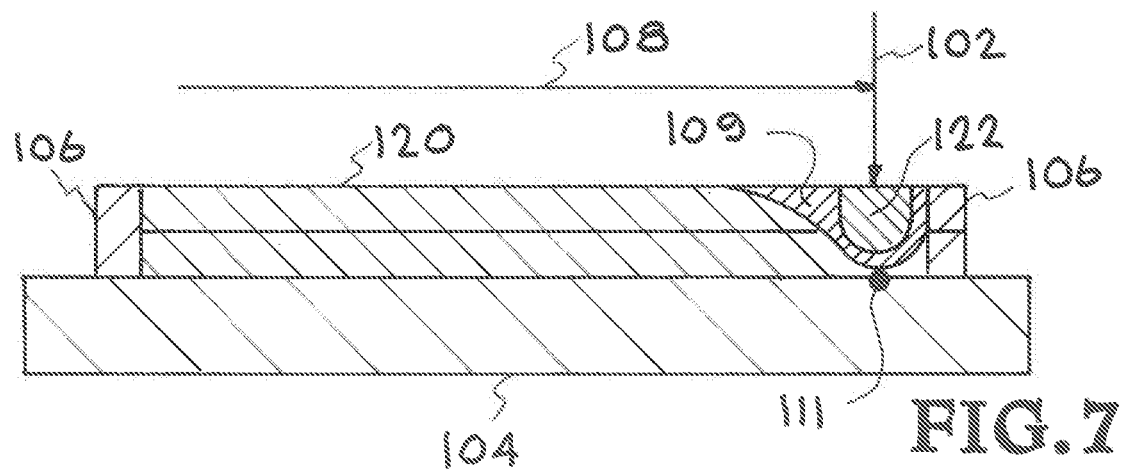
FIG. 7 illustrates how a pore/defect can affect multiple layers of the workpiece.
Figure 8:
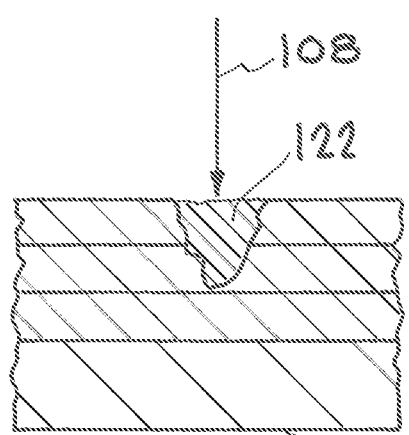
FIG. 8 shows a pore/defect that extends into multiple layers of the workpiece.
Figure 9:
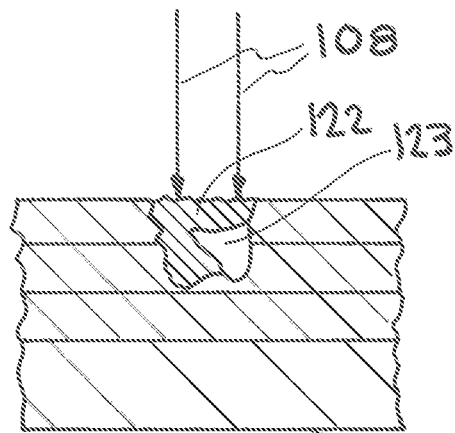
FIG. 9 shows that the pore/defect can get larger if it joins the second tuning point.

Referring now to FIG. 6, a schematic illustration shows the laser beam 102 having reached the first turning point 110. As the laser beam 102 makes it's 90 degree turn it will dwell for a very short time at the turning point 110. Even though the dwell time is very short more energy is deposited at the turning point 110 than is required to melt the power layer 106 and this additional laser power energy can cause too much melting to occur creating a pore/defect 122. FIGS. 7, 8, and 9 illustrate how a pore/defect can affect multiple layers of the workpiece.

Referring now to FIG. 7, a schematic illustration shows that a pore/defect 122 can form. Referring now to FIG. 7, a schematic illustration shows that a pore/defect 122 can form. The laser beam 102 has reached the first turning point 110 as shown in FIG. 6. As the laser beam 102 makes it's 90 degree turn it will dwell for a very short time at the turning point 110 and even though the dwell time is very short more energy is deposited at the turning point 110 than is required to melt the powder layer 106. This additional laser power energy can cause too much melting to occur creating the pore/defect 122. As shown in FIG. 7, the melt pool has depended and extends into the layer below. The defect 122 extends into the layer below and a liquid portion 109 of the melt pool also extends into the liquid portion 109. The inventor's additive manufacturing power map to mitigate defects reduces the laser power as the laser beam moves through the first turning point. As shown in FIG. 7, the tracer point 111 is used by the PID controller. By requesting the temperature variable at that point to be equal to melting temperature, the PID controller will control the power to achieve this end.

Referring now to FIG. 8, an illustration shows that possible pore/defects 122 that can be produced in the workpiece. As the laser beam travels along the laser beam path 108 and makes it's 90 degree turn it will dwell for a very short time at the turning point 110 and more energy is deposited than is required to melt the powder layer and this additional laser power energy can cause too much melting to occur creating the pore/defect 122. As shown in FIG. 8 the pore/defect 122 extends into multiple layers of the workpiece.

Referring now to FIG. 9, an illustration shows that the pore/defect 122 can get larger and a bubble 123 can form and be left in the workpiece. As the laser beam travels along the laser beam path 108 the pore/defect 122 can be enlarged when too much energy is deposited. The quality of the workpiece will be reduced it pore/defect 122 and the bubble 123 remain in the layers of the workpiece. The laser beam will make millions of changes of direction during the construction of a part so many defects could occur.

Figure 10:
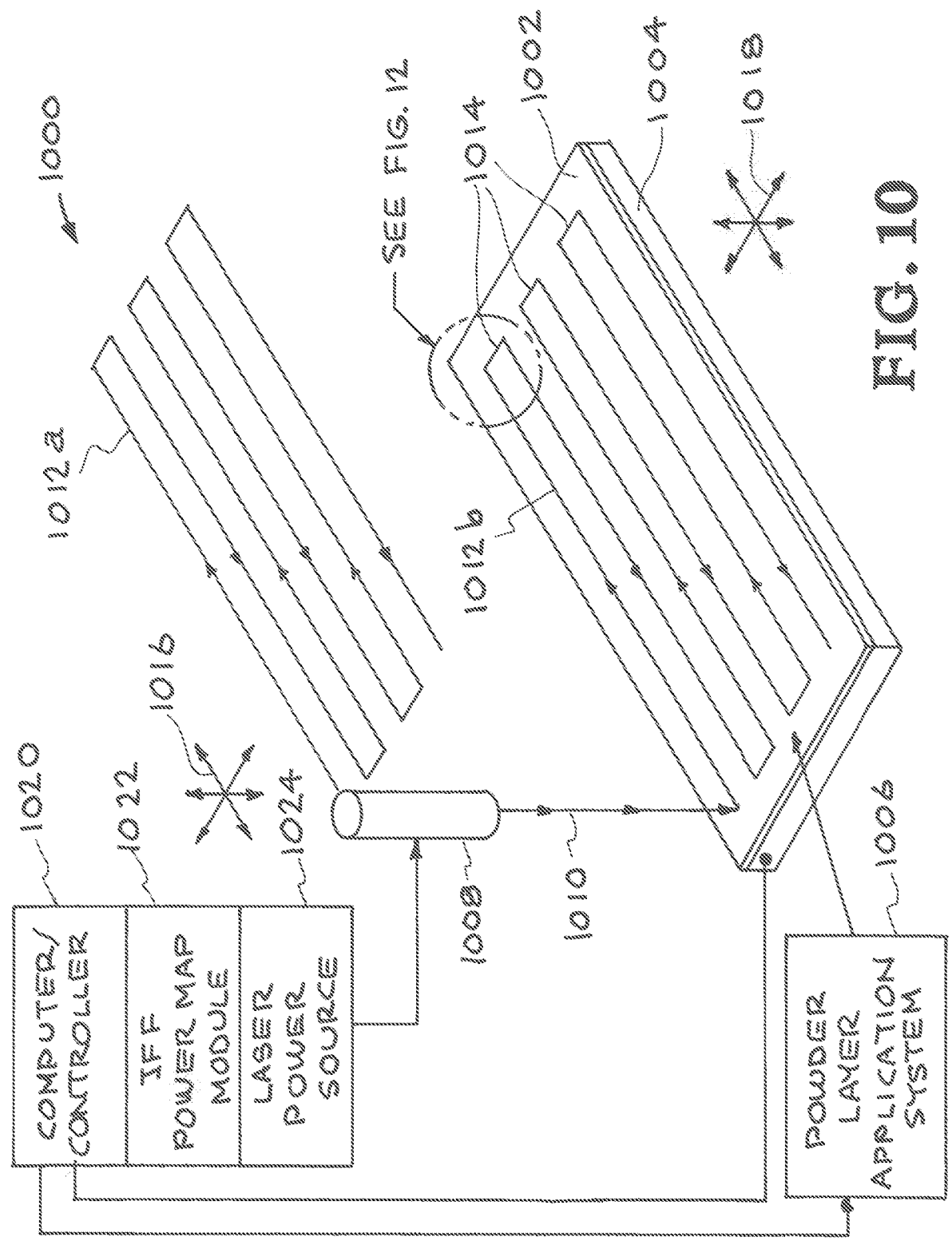
FIG. 10 illustrates an embodiment of the inventor's powder bed fusion system incorporating the inventor's additive manufacturing power map to mitigate defects.

Referring now to FIG. 10, an embodiment of the inventor's powder bed fusion system incorporating the inventor's additive manufacturing power map to mitigate defects is illustrated. This first embodiment is designated generally by the reference numeral 1000. As illustrated in FIG. 10, the embodiment 1000 includes a number of components. The components of the Applicant's powder bed fusion system incorporating the inventor's additive manufacturing power map to mitigate defects 1000 are identified and described below.

Reference Numeral 1002—powder bed,
Reference Numeral 1004—build plane/platform,
Reference Numeral 1006—powder layer application system,
Reference Numeral 1008—laser,
Reference Numeral 1010—laser beam,
Reference Numeral 10012a—laser path,
Reference Numeral 1012b—laser beam path,
Reference Numeral 1014—turning points,
Reference Numeral 1016—laser movement arrows,
Reference Numeral 1018—build plane movement arrows,
Reference Numeral 1020—Computer/Controller,
Reference Numeral 1022—IFF Power Map Module,
Reference Numeral 1024—Laser Power Source.

The description of the structural components of the Applicants' additive manufacturing power map to mitigate defects 1000 illustrated in FIG. 10 having been completed, the operation and additional description of the Applicants first embodiment will now be considered in greater detail. FIG. 10 illustrates a powder bed fusion system incorporating the inventor's additive manufacturing power map to mitigate defects. The powder bed fusion system includes an apparatus in which selected areas of a powder bed 1002 are solidified in a layer-by-layer manner to form a workpiece. The powder bed fusion apparatus includes a build platform 1004 for supporting the powder bed 1002 and a powder applicator 1006 for forming powder layers of the powder bed 1002. The powder applicator 1006 can include different mechanisms for adding the metal powder layer onto the build plane/substrate 1004. For example, a hopper or a reservoir can be used to add fresh metal powder for each layer in the layer by layer process and a roller or a blade can be used to spread the metal powder. The laser 1008 generates a laser beam 1010 across the surface of the powder bed 1002 to solidify the predetermined areas of each layer.

In the operation of Applicants' powder bed fusion system incorporating an additive manufacturing power map to mitigate defects 1000, the laser 1008 follows a laser path 1012a that produces a laser beam path 1012b on the powder bed 1002. The laser beam path 1012b includes turning points 1014. The turning points 1014 can be the source of potential workpiece defects. The inventors have determined that when the laser beam 1010 enters and moves through the turning points 1014, the power of the laser beam 1010 needs to be adjusted. This is further illustrated in FIG. 12.

Figure 11:
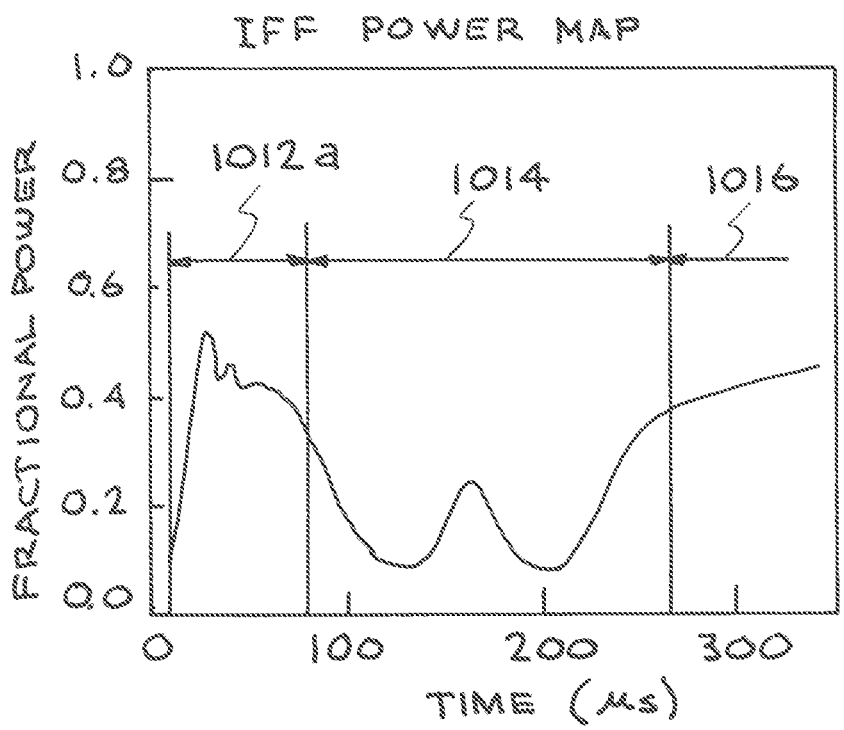
FIG. 11 is a graph that visually illustrates the inventor's additive manufacturing power map to mitigate defects.

Referring now to FIG. 11, an example of a power map of the inventor's additive manufacturing power map to mitigate defects is shown. FIG. 11 is a graph that visually illustrates laser power as the laser solidifies the metal powder to produce the product or part. The graph shows laser power versus time as the laser creates the laser beam and the laser beam moves along the predetermined path in an AM machine. The graph shows portions 1012a, 1014, and 1016 of the laser beam path.

In FIG. 11 the laser power curve is shown ramping up gently in the portion 1012a of the path to help prevent and/or reduce spattering. Application of too much power at the start tends to create spatter. This is one application of the PID controller. In this case, the tracer point is moved from the surface to below the substrate. By requesting the temperature variable at that point to be equal to melting temperature, the PID controller will control the power to achieve this end. By requiring a gently dive from the tracer into the substrate, the power is increased gently until a user specific input melt depth is achieved.

In the middle section of portion 1012a of the laser power curve the power of the laser is shown being at a relative constant power in order to produce a constant melt depth in the straight line path 1012b of the laser beam. The fractional power does not change much in the middle section of portion 1012a of the laser power curve. This is achieved by moving the fictitious tracer point along the path of the laser at a user input melt depth and requiring the temperature at that tracer point to be of a certain fixed value equal to melt temperature.

Eventually the laser beam will need to start turning. As the laser beam makes it's turn it will dwell for a short time at the turning point. Even though the dwell time is short more energy would be deposited at the turning point than required to melt the power layer unless an adjustment is made. This energy will accumulate quickly to cause a deep melt pool with a strong chance of keyholing and production of pores deep in the substrate. The end section of portion 1012a of the laser power curve illustrates the start of the turning. The inventors additive manufacturing power map implements desired laser power changes as the laser beam starts to move through the first 90 degree turning point. The inventors power map system utilizes the PID (proportional integral derivative) to decrease the laser power and maintain a constant melt depth. Since the energy is accumulating in that region, the temperature at the tracer point is maintained fixed. The PID then controls the power by decreasing it, so as to decrease the amount of energy deposited and maintain a constant temperature value at the depth of the tracer point. This in turns guarantees fixed melt pool depth and prevents formation of deep pores.

The portion 1014 of the laser power curve illustrates the turning of the laser beam from the straight line path 1012b to the straight line path 1016. The graph shows laser power is raised slightly as the laser beam travels a short distance to reach the second 90 degree turning point. This rise depends on the track of the laser. If the distance traveled between the two 90 degree turning point is large, the PID will raise the power to compensate for melting extra cold material between the two points. The laser beam then executes the last turning point and again ramps up in power to make the next pass 1016 maintaining a constant melt depth.

Figure 12:
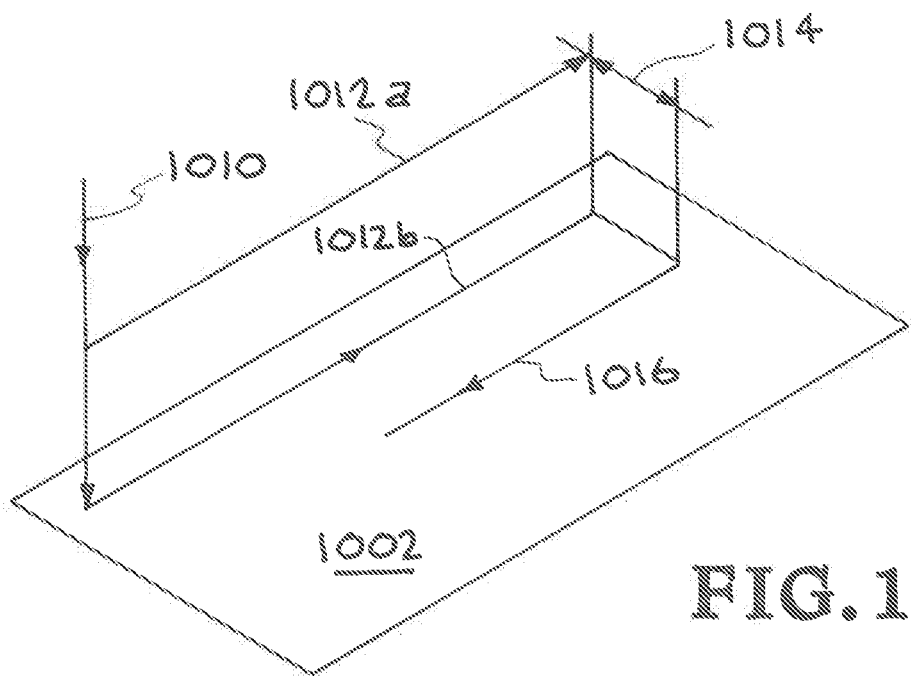
FIG. 12 is a schematic illustration showing details of the inventor's additive manufacturing power map laser beam path on the powder layer.

Referring now to FIG. 12, the "turning points" area of FIG. 10 is illustrated in expanded form and with greater detail. As shown, the laser beam 1010 moves along the straight line path 1012b, enters the first 90 degree turning point, moves along a short straight line path 1014, enters the second 90 degree turning point, and moves along the straight line path 1016.

As the laser 1010 follows the laser path 1012a and produces the laser beam path 1012b on the powder bed 1002, turning points 1014 are encountered when the laser beam path 1012b changes from a steady straight line. The design of the workpiece requires that the laser beam path 1012b turn from the steady straight line to produce the workpiece. The laser beam 1010 enters and moves through the turning points and then moves along the second pass 1016. The inventors have determined that when the laser beam 1010 enters and moves through the turning points, the power of the laser beam 1010 needs to be adjusted because the turning points are the source of potential workpiece defects.

The inventors' apparatus, systems, and methods produce a power map that describes laser power changes as the laser beam moves along a path to create the product or part. The map shown is a fractional power versus time. The time is related to the laser's position on the build plate in time. The fractional power is a factor that multiplies the total power input to the code, to retrieve the actual power that was applied at the particular time. When the power map is adopted by an AM machine, laser power is changed appropriately to prevent defects in the product or part. The power map is specific to the metal used as well as to the geometry of the build and the scan speed. It will have to be repeated for each case. But once it is done, it can be reused.

In one embodiment the inventors' apparatus, systems, and methods uses a computer model with a feedback loop control, that dynamically changes the laser power, so as to meet a certain criterion. The criterion that was exhibited in this document pertains to tracking one tracer point that follows the laser at a given location depth in the substrate, and controlling the temperature at that tracer point to be a fixed value equal to the melt temperature. In this problem, the algorithm used is based on Proportional Integral Derivative controller or PID. The PID is used to maintain a fixed temperature at a given depth. This will be imposed by the user. The PID does that by controlling the power to achieve the desired fixed temperature at the desired melt pool depth. A computer model is used to generate the appropriate power to maintain a constant temperature at the tracer point. In this case, the melting temperature of stainless steel was imposed at that point, so as to control the melt pool depth.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of numerical methods, reduced order models, machine learning models based on neural networks for example, diagnostic apparatus such as X-rays or pyrometers, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. For instance, the PID controller could be coupled to an actual AM machine and controlling AM parameters while monitoring variables such as depth provided by X-rays or temperature provided by pyrometers, or machine learning models. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The invention claimed is:

1. A laser powder bed fusion additive manufacturing method for producing a product or part including preventing or reducing spattering, comprising the steps of:
providing a powder bed of metal powder and
a laser with laser power that produces
a laser beam that follows a laser path on said powder bed to solidify said metal power,
creating a power map that is an intelligent feed forward model to control the laser powder bed fusion additive manufacturing for producing the product or part,
providing a proportional-integral-derivative controller,
providing a moving tracer point that is controlled by said proportional-integral-derivative controller, wherein the moving tracer point locates below the laser beam inside the powder bed at a given depth,
using said power map to control the laser powder bed fusion additive manufacturing,
using said proportional-integral-derivative controller and said moving tracer point at the start to ramp up said laser power of said laser on said laser path preventing or reducing spattering,
using said proportional-integral-derivative controller and said moving tracer point as said laser beam follows a straight line to maintain said laser power of said laser constant, and
using said proportional-integral-derivative controller and said moving tracer point for performing corner turning by controlling said laser power so as to decrease said laser power for producing the product or part.

2. The laser powder bed fusion additive manufacturing method for producing a product or part of claim 1 wherein said step of providing a moving tracer point comprises creating said moving tracer point in a computer model.

3. The laser powder bed fusion additive manufacturing method for producing a product or part of claim 2 wherein said step of creating said moving tracer point in a computer model includes using said moving tracer point that has been created in a computer model to control the said laser power.

4. The laser powder bed fusion additive manufacturing method for producing a product or part of claim 1 wherein said laser beam follows said laser path in making a second turn and compensating for cold material;
further comprising a step of
using said proportional-integral-derivative controller and said moving tracer point to raise said laser power as said laser beam follows said laser path before making said second turn compensating for the cold material.

5. A laser powder bed fusion additive manufacturing method for producing a product or part that prevents or reduces spattering, comprising the steps of:
providing a powder bed of metal powder,
providing a laser with laser power that produces a laser beam that follows a laser path on said powder bed to solidify said metal power,
creating a power map that is an intelligent feed forward model to control the laser powder bed fusion additive manufacturing for producing the product or part,
providing a proportional-integral-derivative controller,
providing a moving tracer point, wherein the moving tracer point locates below the laser beam inside the powder bed at a given depth,
using said power map for controlling said laser,
using said proportional-integral-derivative controller and said moving tracer point at the start wherein said moving tracer point moves on said laser path on said powder bed to ramp up said laser power preventing or reducing spattering,
using said proportional-integral-derivative controller and said moving tracer point as said laser beam follows a straight line to maintain said laser power of said laser constant,
using said proportional-integral-derivative controller and said moving tracer point for performing first corner turning by controlling said laser power so as to decrease said laser power,
using said proportional-integral-derivative controller and said moving tracer point as said laser beam follows said laser path in making a second turn to raise said laser power as said laser beam follows said laser path before making said second turn compensating for cold material for producing the product or part.

6. The laser powder bed fusion additive manufacturing method for producing a product or part of claim 5 wherein said step of providing a moving tracer point comprises creating said tracer point in a computer model.

7. The laser powder bed fusion additive manufacturing method for producing a product or part of claim 6 wherein said step of creating said moving tracer point in a computer model includes using said moving tracer point that has been created in a computer model to control said laser power.

8. A laser powder bed fusion additive manufacturing apparatus for producing a product or part that prevents or reduces spattering, prevents or reduces formation of deep pores, and compensates for cold material; comprising:
a powder bed of metal powder,
a laser with laser power that produces a laser beam that follows a laser path on said powder bed to solidify said metal power,
a power map that is an intelligent feed forward model to control the laser powder bed fusion additive manufacturing for producing the product or part,
a proportional-integral-derivative controller, and
a moving tracer point created in a computer model, wherein the moving tracer point locates below the laser beam inside the powder bed at a given depth,
wherein said proportional-integral-derivative controller and said moving tracer point are operatively connected to gently begin ramping up said laser power of said laser on said laser path and at the start wherein said moving tracer point moves on said laser path on said powder bed to ramp up said laser power preventing or reducing spattering,
wherein said proportional-integral-derivative controller and said moving tracer point are operatively connected as said laser beam follows a straight line to maintain said laser power of said laser constant,
wherein said proportional-integral-derivative controller and said moving tracer point are operatively connected for performing first corner turning by controlling said laser power so that said laser power is decreased as said laser beam follows said laser path in making said turn to prevent formation of the deep pores,
wherein said proportional-integral-derivative controller and said moving tracer point are operatively connected as said laser beam follows said laser path to make a turn and will dwell for a time before making said turn, and wherein said proportional-integral-derivative controller and said moving tracer point are operatively connected and raises said laser power as said laser beam follows said laser path before making a second turn compensating for the cold material.

* * * * *